US012782262B2

(12) United States Patent
Aqeel et al.

(10) Patent No.: US 12,782,262 B2
(45) Date of Patent: Nov. 3, 2026

(54) DETERMINING MICROBIOLOGICAL CORROSION PROGRESSION

(71) Applicant: Saudi Arabian Oil Company, Dhahran (SA)

(72) Inventors: Sarah A. Aqeel, Dhahran (SA); Layan Alaeddin AlSharif, Dhahran (SA); Abdulrahman Mohammed Alqahtani, Al-Khobar (SA); Hamad Alsaiari, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 186 days.

(21) Appl. No.: 18/760,647

(22) Filed: Jul. 1, 2024

(65) Prior Publication Data

US 2026/0002865 A1 Jan. 1, 2026

(51) Int. Cl.

| | |
|---|---|
| ***G01N 17/02*** | (2006.01) |
| ***G01N 17/04*** | (2006.01) |
| ***G01N 27/30*** | (2006.01) |

(52) U.S. Cl.

CPC ........... *G01N 17/02* (2013.01); *G01N 17/043* (2013.01); *G01N 27/301* (2013.01); *G01N 27/302* (2013.01)

(58) Field of Classification Search

None

See application file for complete search history.

(56) References Cited

U.S. PATENT DOCUMENTS

| | | | |
|---|---|---|---|
| 7,686,938 | B2 | 3/2010 | Gill et al. |
| 11,674,885 | B2 | 6/2023 | Monty-Bromer et al. |

(Continued)

FOREIGN PATENT DOCUMENTS

| | | | |
|---|---|---|---|
| CN | 106248570 | B | 8/2018 |
| CN | 106404578 | B | 11/2019 |

(Continued)

OTHER PUBLICATIONS

ASTM, "Standard Test Method for Conducting Cyclic Potentiodynamic Polarization Measurements to Determine the Corrosion Susceptibility of Small Implant Devices," ASTM F 2129-08, Originally approved in 2001, Published Nov. 2008, 6 pages.

(Continued)

*Primary Examiner* — J. Christopher Ball

(74) *Attorney, Agent, or Firm* — Fish & Richardson P.C.

(57) ABSTRACT

Techniques for determining microbiological corrosion include flowing a mixed-phase wellbore fluid from at least one tank into a volume of a reactor tank of a microbiological corrosion reactor; controlling a multi-channel potentiostat coupled to a three-electrode cell assembly positioned in the volume, the three-electrode cell assembly including a working electrode, a counter electrode, and a reference electrode, where each of the working electrode, the counter electrode, and the reference electrode is positioned in the volume to contact the mixed-phase wellbore fluid; based on controlling the multi-channel potentiostat, activating the working electrode in the mixed-phase wellbore fluid in the volume; and determining, based on activating the working electrode, a corrosion rate of at least one of the working electrode or a target coupon positioned within the mixed-phase wellbore fluid in the volume.

29 Claims, 3 Drawing Sheets

(56) References Cited

U.S. PATENT DOCUMENTS

| | | | |
|---|---|---|---|
| 11,718,801 B2 | 8/2023 | Zhu et al. | |
| 12,065,612 B1 | 8/2024 | AlSharif | |
| 12,345,670 B2 | 7/2025 | AlSharif | |
| 12,523,627 B2 | 1/2026 | Alarwi et al. | |
| 12,529,689 B2 | 1/2026 | Alshahrani et al. | |
| 12,566,126 B2 | 3/2026 | Alqahtani et al. | |
| 2022/0381674 A1* | 12/2022 | Al-Khaldi | C12M 41/46 |
| 2023/0314305 A1 | 10/2023 | Ake et al. | |
| 2024/0117731 A1 | 4/2024 | Alerwi et al. | |
| 2024/0139891 A1 | 5/2024 | Fakiri et al. | |
| 2024/0142407 A1 | 5/2024 | Alqahtani et al. | |
| 2024/0183419 A1 | 6/2024 | AlSharif et al. | |
| 2024/0254735 A1 | 8/2024 | AlSharif et al. | |
| 2024/0286218 A1 | 8/2024 | Qahtani et al. | |
| 2024/0384606 A1 | 11/2024 | Swett | |
| 2025/0076181 A1 | 3/2025 | AlSharif et al. | |
| 2025/0129286 A1 | 4/2025 | Alsaiari et al. | |
| 2025/0191127 A1 | 6/2025 | Patel et al. | |
| 2025/0225784 A1 | 7/2025 | Alshehri et al. | |
| 2025/0376999 A1 | 12/2025 | Alyami et al. | |
| 2026/0002328 A1 | 1/2026 | Alerwi et al. | |
| 2026/0036483 A1 | 2/2026 | Alerwi et al. | |

FOREIGN PATENT DOCUMENTS

| | | | |
|---|---|---|---|
| CN | 110542649 A | 12/2019 | |
| CN | 114755167 A * | 7/2022 | G01N 17/02 |

OTHER PUBLICATIONS

ASTM, “Standard Test Method for Conducting Potentiodynamic Polarization Resistance Measurements,” ASTM G59-97, Originally approved in 1978, 4 pages.

Eisenberg et al., “Ionic Mass Transfer and Concentration Polarization at Rotating Electrodes,” Journal of The Electrochemical Society, Jun. 1954, 101(6):306-320, 15 pages.

International Search Report and Written Opinion in International Appln. No. PCT/US2025/035874, mailed on Sep. 29, 2025, 13 pages.

* cited by examiner

DETERMINING MICROBIOLOGICAL CORROSION PROGRESSION

TECHNICAL FIELD

The present disclosure describes apparatus, systems, and methods for determining a microbiological corrosion progression and assessment in multiphase crude oil pipeline systems.

BACKGROUND

Microbial corrosion, also known as microbiologically influenced corrosion (MIC), is a significant issue affecting various industries including oil and gas. MIC occurs when microorganisms, such as bacteria, fungi, and archaea, interact with metal surfaces, leading to accelerated corrosion rates. Understanding and mitigating microbial corrosion is crucial for maintaining the integrity of valuable structures such as trunk lines, flowlines and in-tie lines.

SUMMARY

In an example implementation, a microbiological corrosion reactor includes a reactor tank including a volume configured to enclose a mixed-phase wellbore fluid; and a three-electrode cell assembly positioned in the volume. The three-electrode cell assembly includes a working electrode, a counter electrode, and a reference electrode. Each of the working electrode, the counter electrode, and the reference electrode is positioned in the volume to contact the mixed-phase wellbore fluid. The microbiological corrosion reactor includes a multi-channel potentiostat coupled to the three-electrode cell assembly; at least one fluid tank fluidly coupled to the reactor tank through a conduit that includes a valve, where the at least one fluid tank is configured to hold a volume of the mixed-phase wellbore fluid; and a control system coupled to the multi-channel potentiostat. The control system is configured to perform operations including controlling the multi-channel potentiostat to operate the working electrode within the mixed-phase wellbore fluid in the volume; and determining, based on operation of the working electrode, a corrosion rate of at least one of the working electrode or a target coupon positioned within the mixed-phase wellbore fluid in the volume.

In an aspect combinable with the example implementation, the at least one fluid tank includes a plurality of fluid tanks, and each of the plurality of fluid tanks fluidly is coupled to the reactor tank through a respective conduit that includes a respective valve.

In another aspect combinable with one, some, or all of the previous aspects, a particular fluid tank is configured to hold an inert gas, and another particular tank is configured to hold an acid gas.

In another aspect combinable with one, some, or all of the previous aspects, the operations include operating the respective valve of the another particular fluid tank configured to hold the inert gas to flow a portion of the inert gas into the volume of the reactor tank; and operating the respective valve of the another particular fluid tank configured to hold the acid gas to flow a portion of the acid gas into the volume of the reactor tank.

In another aspect combinable with one, some, or all of the previous aspects, the inert gas includes nitrogen, and the acid gas includes at least one of carbon dioxide or hydrogen sulfide.

In another aspect combinable with one, some, or all of the previous aspects, the operations include determining, subsequent to at least one of flowing the portion of the inert gas or flowing the portion of the acid gas into the volume of the reactor tank, the corrosion rate of at least one of the working electrode or the target coupon.

Another aspect combinable with one, some, or all of the previous aspects includes an inhibitor port and inhibitor valve fluidly coupled to the volume of the reactor tank; and a chemical injection port and chemical valve fluidly coupled to the volume of the reactor tank.

In another aspect combinable with one, some, or all of the previous aspects, the operations include at least one of operating the inhibitor valve to flow a corrosion inhibitor fluid through the inhibitor fluid port and into the volume of the reactor tank; or operating the chemical valve to flow a chemical fluid through the chemical injection port and into the volume of the reactor tank.

In another aspect combinable with one, some, or all of the previous aspects, the operations include determining, subsequent to at least one of flowing the corrosion inhibitor fluid or flowing the chemical fluid into the volume of the reactor tank, the corrosion rate of at least one of the working electrode or the target coupon.

Another aspect combinable with one, some, or all of the previous aspects includes a plurality of sensors fluidly coupled to the mixed-phase wellbore fluid in the volume of the reactor tank.

In another aspect combinable with one, some, or all of the previous aspects, each of the plurality of sensors is configured to measure a value of a characteristic of the mixed-phase wellbore fluid.

In another aspect combinable with one, some, or all of the previous aspects, the plurality of sensors include at least one temperature sensor, at least one gas sensor, and at least one pH sensor.

Another aspect combinable with one, some, or all of the previous aspects includes a pressure relief valve positioned in a conduit in fluid communication with the volume of the reactor tank; and a vent valve in fluid communication with the volume of the reactor tank.

In another aspect combinable with one, some, or all of the previous aspects, the operations include operating at least one of the pressure relief valve or the vent valve to exhaust a gas phase of the mixed-phase wellbore fluid in the volume to the atmosphere based on a measured value of a particular characteristic of the mixed-phase wellbore fluid.

Another aspect combinable with one, some, or all of the previous aspects includes a drain outlet positioned at or near a bottom of the reactor tank, the drain outlet including an outlet valve.

In another aspect combinable with one, some, or all of the previous aspects, the working electrode includes a rotating cylinder electrode.

In another aspect combinable with one, some, or all of the previous aspects, the operation of controlling the multi-channel potentiostat to operate the working electrode within the mixed-phase wellbore fluid in the volume includes activating the rotating cylinder electrode to spin within the mixed-phase wellbore fluid.

In another aspect combinable with one, some, or all of the previous aspects, the operation of determining, based on operation of the working electrode, the corrosion rate of at least one of the working electrode or the target coupon positioned within the mixed-phase wellbore fluid in the volume includes executing a potentiodynamic polarization test to sweep an electric potential applied to the working electrode across a range; measuring, with the multi-channel potentiostat, a current across the working electrode during the potentiodynamic polarization test; generating a polarization curve from the current measurements; and determining the corrosion rate from the polarization curve.

Another example implementation includes a method for determining microbiological corrosion that includes flowing a mixed-phase wellbore fluid from at least one tank into a volume of a reactor tank of a microbiological corrosion reactor; controlling a multi-channel potentiostat coupled to a three-electrode cell assembly positioned in the volume, the three-electrode cell assembly including a working electrode, a counter electrode, and a reference electrode, where each of the working electrode, the counter electrode, and the reference electrode is positioned in the volume to contact the mixed-phase wellbore fluid; based on controlling the multi-channel potentiostat, activating the working electrode in the mixed-phase wellbore fluid in the volume; and determining, based on activating the working electrode, a corrosion rate of at least one of the working electrode or a target coupon positioned within the mixed-phase wellbore fluid in the volume.

In an aspect combinable with the example implementation, flowing the mixed-phase wellbore fluid from the at least one tank into the volume of the reactor tank of the microbiological corrosion reactor includes flowing oil from a first tank of the at least one tank into the volume; and separately from flowing the oil, flowing water from a second tank of the at least one tank into the volume.

Another aspect combinable with one, some, or all of the previous aspects includes at least one of flowing an inert gas from a third tank of the at least one tank into the volume of the reactor tank; or flowing an acid gas from a fourth tank of the at least one tank into the volume of the reactor tank.

In another aspect combinable with one, some, or all of the previous aspects, the inert gas includes nitrogen, and the acid gas includes at least one of carbon dioxide or hydrogen sulfide.

Another aspect combinable with one, some, or all of the previous aspects includes determining, subsequent to flowing the at least one of the inert gas or the acid gas into the volume of the reactor tank, the corrosion rate of the at least one of the working electrode or the target coupon positioned within the mixed-phase wellbore fluid in the volume.

Another aspect combinable with one, some, or all of the previous aspects includes at least one of flowing a corrosion inhibitor fluid into the volume of the reactor tank; or flowing a chemical fluid into the volume of the reactor tank.

In another aspect combinable with one, some, or all of the previous aspects, the corrosion inhibitor includes at least one of a Tetrakis Hydroxymethyl Phosphonium Sulfate (THPS) or Glutaraldehyde based chemicals.

In another aspect combinable with one, some, or all of the previous aspects, the chemical fluid includes at least one of anodic inhibitors, cathodic inhibitors, fatty amines, organic acids-based corrosion, condensed phosphates, phosphate salts, poly (acrylic acid) (PAA), phosphinocarboxylic acid, sulfonated polymers, or phosphonates.

Another aspect combinable with one, some, or all of the previous aspects includes determining, subsequent to flowing the at least one of the corrosion inhibitor or the chemical fluid into the volume of the reactor tank, the corrosion rate of the at least one of the working electrode or the target coupon positioned within the mixed-phase wellbore fluid in the volume.

Another aspect combinable with one, some, or all of the previous aspects includes measuring, with at least one of a plurality of sensors fluidly coupled to the mixed-phase wellbore fluid in the volume of the reactor tank, a value of a characteristic of the mixed-phase wellbore fluid.

In another aspect combinable with one, some, or all of the previous aspects, the characteristic of the mixed-phase wellbore fluid includes at least one of temperature, gas cut of the mixed-phase wellbore fluid, or pH.

Another aspect combinable with one, some, or all of the previous aspects includes operating at least one of a pressure relief valve or a vent valve to exhaust a gas phase of the mixed-phase wellbore fluid in the volume to the atmosphere based on a measured value of a particular characteristic of the mixed-phase wellbore fluid.

Another aspect combinable with one, some, or all of the previous aspects includes removing a sample of the mixed-phase wellbore fluid through a drain outlet positioned at or near a bottom of the reactor tank by operating an outlet valve.

In another aspect combinable with one, some, or all of the previous aspects, the working electrode includes a rotating cylinder electrode.

In another aspect combinable with one, some, or all of the previous aspects, activating the working electrode in the mixed-phase wellbore fluid in the volume includes activating the rotating cylinder electrode to spin within the mixed-phase wellbore fluid.

In another aspect combinable with one, some, or all of the previous aspects, determining, based on activating the working electrode, the corrosion rate of at least one of the working electrode or the target coupon positioned within the mixed-phase wellbore fluid in the volume includes executing a potentiodynamic polarization test to sweep an electric potential applied to the working electrode across a range; measuring, with the multi-channel potentiostat, a current across the working electrode during the potentiodynamic polarization test; generating a polarization curve from the current measurements; and determining the corrosion rate from the polarization curve.

Implementations according to the present disclosure may include one or more of the following features. For example, implementations according to the present disclosure can incorporate of electrochemical methods for precise corrosion rate measurements in a reactor. Also, implementations according to the present disclosure can enable control over the introduction of acid gasses (for example, carbon dioxide, hydrogen sulfide, or both) at partial pressures to permit compatibility tests for corrosion inhibitors, scale inhibitors, and biocides in a high-pressure, high-temperature (HPHT) environment. Further, implementations according to the present disclosure can allow for a thorough simulation of extreme conditions found in hydrocarbon pipeline and other systems.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes example implementations of a microbiological corrosion reactor. In some aspects, the example implementations of a microbiological corrosion reactor according to the present disclosure can include an electrochemical-based microbiological corrosion simulator for real-time monitoring of corrosion rates within a wellbore fluid, such as a three-phase hydrocarbon fluid that flows through, for instance, hydrocarbon pipeline systems. In example aspects, the microbiological corrosion reactor can be operated to control partial pressures of one or more acid gasses such as carbon dioxide and hydrogen sulfide, which are typically found in hydrocarbon fluid and cause corrosion. By controlling the partial pressure of such acid gasses introduced or entrained in the hydrocarbon fluid in the reactor, corrosion and corrosion rates can be accurately simulated under conventional and adjustable pipeline conditions.

Example implementations of a microbiological corrosion reactor can be operated to simulate a three-phase crude oil pipeline system by an embedded three electrode cell assembly that includes a working electrode, a counter electrode, and a reference electrode all mounted in a volume of the reactor that holds a mixed-phase hydrocarbon fluid (for example, gas, oil, and water). The three electrode cell assembly can be operated to execute real-time electrochemical tests. In some aspects, the working electrode can be designed as a rotating cylinder (or rotating cylinder electrode, RCE) to function as an agitator within the mixed-phase fluid (such as a mixed-phase wellbore fluid) within the volume of the reactor. In some aspects, operation of the reactor can be controlled by a programmable control circuit that maintains optimal operational conditions as well as an inert gas purging assembly that is operable to ensure an anaerobic environment within the reactor.

Figure 1:
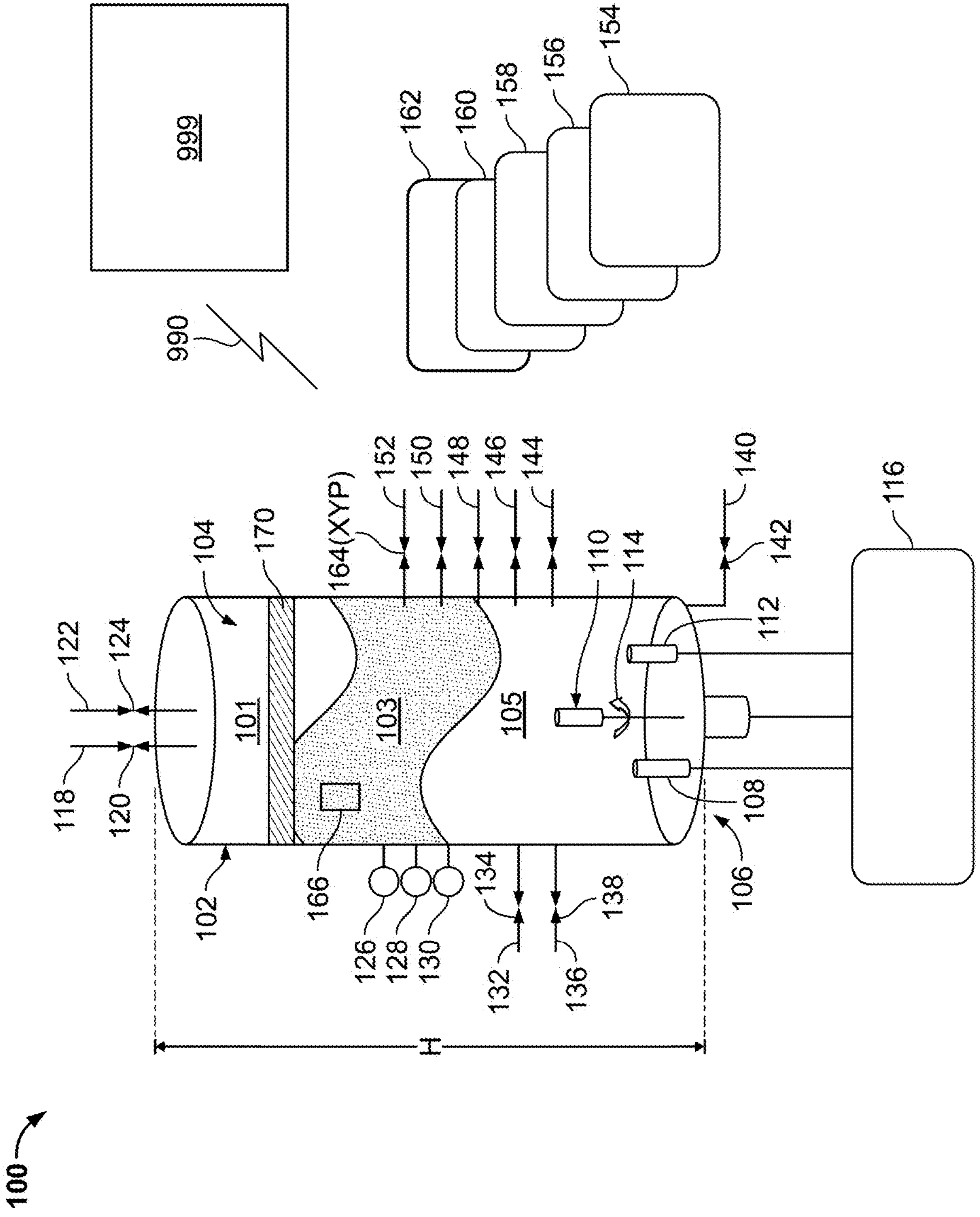
FIG. 1 is a schematic diagram of an example implementation of a microbiological corrosion reactor according to the present disclosure.

FIG. 1 is a schematic diagram of an example implementation of a microbiological corrosion reactor (MCR) 100 according to the present disclosure. Generally, MCR 100 can be operated to simulate a three-phase hydrocarbon (for example, crude oil) transfer system, such as a crude oil pipeline system, in the presence of microbial organisms that trigger microbial induced/influenced corrosion (MIC). As shown in the example implementation, the MCR 100 includes a reactor tank 102 that defines a volume 104 into which a mixed-phase fluid that includes gas 101, oil 103, and water 105 can be introduced and enclosed.

The example MCR 100 further includes an embedded three-electrode cell assembly 106 that is comprised of a working electrode (WE) 110, a counter electrode (CE) 112, and a reference electrode (RE) 108. The WE 110 (also referred to as RCE 110) is where the electrochemical reactions of interest occur, while the CE 112 operates to complete the circuit within the electrochemical cell of the three-electrode cell assembly 106 to maintain a constant potential at the WE 110. The RE 108 allows for measurement of the potential of the WE 110 relative to a stable reference.

In some aspects, the WE 110 can be made of a material that is similar to or matches a material from which a hydrocarbon pipeline is manufactured in order to accurately simulate corrosion behavior. In some aspects, the CE 112 can be made of an inert material such as platinum or gold to avoid interference with electrochemical measurements. Additionally, the WE 110 can be made of materials that form the electrically conductive path and avoid direct metal-metal contact to prevent galvanic corrosion, which could compromise the integrity of the measurements and skew the results of the operation of the MCR 100. In some aspects, a choice of insulating materials and connectors is designed to prevent any unintended galvanic couples, thereby preserving the accuracy of the measurements and the longevity of the MCR 100.

As previously described, the WE 110 can be implemented as a rotating cylinder electrode (RCE) 110. The RCE 110 can include an agitator 114 and, generally, is operated to rotate or spin within the volume 104. In some aspects, the agitator 114 can be adjusted along a height, H, of the volume 104. For example, the agitator 114 can be mounted on a vertically-adjustable shaft of the RCE 110 to allow for movement within the different phases (for example, the oil 103, water 105, or gas 101) by enabling variations in its height inside the volume 104. Such height variations can facilitate measurements in the different phases of the fluid within the volume 104. A shaft holding the RCE 110 can be adjustable to allow movement within different phases (oil 103/water 105) and further enhance system versatility. A retractable mechanism can enable easy insertion and removal of the WE/RCE 110. This mechanism ensures minimal oxygen ingress and/or fluid loss from the cell during the removal process, thus maintaining the anaerobic conditions for the tests.

Through such operation, the RCE 110 can simulate hydrodynamic conditions adjacent to, for example, a sample coupon 166 or the RCE 110 itself within the volume 104 (and immersed in the three-phase fluid) by generating a known and constant wall shear stress. Thus, an anaerobic environment within volume 104 can be ensured through such operation and with an inert gas purging in the MCR 100 as explained more fully herein.

The example implementation of the MCR 100, as explained in more detail herein, can be operated to execute real-time electrochemical tests, such as Open Circuit Potential (OCP), Linear Polarization Resistance (LPR), Electrochemical Impedance Spectroscopy (EIS), and Potentiodynamic Polarization (PDP), each of which can provide more accurate, faster, and continuous measurements of the corrosion rates compared to conventional weight-loss techniques that measure corrosion rates. As shown in FIG. 1, a multichannel potentiostat 116 is communicably coupled to the three-electrode cell assembly 106 to control electrical current supplied to one or more of the electrodes.

As illustrated in the example of FIG. 1, the MCR 100 includes a pressure relief conduit 118 with a pressure relief valve (PRV) 120. In some aspects, the PRV 120 can be set at an opening pressure that is high enough to allow the MCR 100 to operate but relieve one or more fluids in the volume 104 should the operating pressure exceed the set pressure. The MCR 100 also can include a ventilation conduit 122 and ventilating valve 124 that can, at a particular gas pressure within the volume 104, open to ventilate gasses to the atmosphere.

As further illustrated in FIG. 1, the MCR 100 (optionally) includes one or more temperature sensors 126, one or more gas sensors 128, and one or more pH sensors 130. In some aspects, the illustrated sensors can measure certain conditions (for example, temperature, pH, phase composition) of the mixed-phase fluid composition (gas 101, oil 103, water 105) within the volume 104 to perform the electrochemical analyses described herein.

In some aspects, the valves 124 and 120 can be operated (for example, by a control system 999) in combination with the sensors 126, 128 and/or 130 a safety situation. For example, over-temperature and over-pressure protection measures can be taken by opening one or both of the valves 120 and 124 according to sensed values by one or more of sensors 126, 128, and/or 130. Such sensed values can be overall system pressure, reactive gasses partial pressures ($CO_2$, $H_2S$) and temperature.

The example implementation of the MCR 100 includes a biocide/inhibitor conduit 132 and a biocide/inhibitor valve 134 through which one or more biocides or corrosion inhibitors can be introduced into the volume 104. Introduction of a biocide or inhibitor can be used for testing purposes, such as to make determinations about the success or failure of particular biocides in preventing or reducing biogrowth in the volume 104. For instance, non-oxidizing biocides such as Tetrakis Hydroxymethyl Phosphonium Sulfate (THPS) and Glutaraldehyde based chemicals can be introduced into the volume 104 through biocide/inhibitor conduit 132 and the biocide/inhibitor valve 134 (which can be opened or closed to permit or deny such introduction). Subsequent to introduction of a biocide or corrosion inhibitor into the volume 104, a determination (for example, by control system 999) can be made as to a corrosion rate of the RCE 110 or target coupon 166 or both) so as to determine an effectiveness of the biocide or corrosion inhibitor.

The example implementation of the MCR 100 includes a chemical conduit 136 and a chemical valve 138 through which one or more chemicals can be introduced into the volume 104. Introduction of a chemical can be used for testing purposes, such as to make determinations about the success or failure of particular chemicals as corrosion or scale inhibitors. For instance, corrosion inhibitors include anodic inhibitors and cathodic inhibitors such as Fatty Imidazolines based compounds to prevent acid corrosion; fatty amines and organic acids-based corrosion inhibitors to prevent acid gas corrosion. Scale inhibitors can include organic and inorganic inhibitors, such as condensed phosphates (for example, poly (metaphosphate) s or phosphate salts); organic scale inhibitors including poly (acrylic acid) (PAA), phosphinocarboxylic acid, sulfonated polymers, and phosphonates. Chemicals can be introduced into the volume 104 through chemical conduit 136 and the chemical valve 138 (which can be opened or closed to permit or deny such introduction). Subsequent to introduction of a chemical into the volume 104, a determination (for example, by control system 999) can be made as to a corrosion rate of the RCE 110 or target coupon 166 or both) so as to determine an effectiveness of the chemical.

As shown in FIG. 1, the MCR 100 includes multiple conduits 144, 146, 148, 150, and 152, each of which includes a valve 164 (for example, a shut off or modulating valve). The conduits 144, 146, 148, 150, and 152 are fluidly coupled to respective tanks 154, 156, 158, 160 and 162. In some aspects, each tank can hold a fluid that is introduced into the volume 104 by opening a respective valve in the conduit that is coupled to the tank.

For example, tank 154 can hold a mixed-phase wellbore fluid, such as a production fluid that includes the oil 103 and the water 105. Alternatively, there can be separate tanks 154 for each of the oil 103 and the water 105 (along with separate conduits 144 and valves 164 for each) thereby allowing the oil 103 and water 105 to be introduced into the volume 104 in specified proportions to more closely mimic a multi-phase (or mixed-phase) fluid in a hydrocarbon piping network.

Tank 156 can hold an inert gas, such as nitrogen ($N_2$). Tank 158 can hold an acid gas, such as hydrogen sulfide ($H_2S$). Tank 160 can hold an acid gas, such as carbon dioxide ($CO_2$). Through operation of the respective valves 164, the conduits 144, 146, 148, 150, and 152 can be selectively opened to flow the respective fluids in tanks 154, 156, 158, 160, and 162 into the volume 104. For example, first, the production fluid can be introduced into the volume 104 (where it separates by density differences into the water 105, oil 103, and gas 101). Second, gases such as $CO_2$ and $H_2S$, can be introduced to enable the control of their partial pressures to closely simulate real hydrocarbon pipe conditions. Temperature control can be achieved by adjusting the temperature of the supplied fluids in the tanks 154 through 162 (for example, by heating or cooling). The introduction of the inert gas can be used as a purging mechanism to maintain an oxygen-free environment, which can be used for sustaining anaerobic conditions.

As further shown in FIG. 1, the MCR 100 includes an outlet conduit 140 with an outlet valve 142. Outlet valve 142 can be operated to open and allow a sample to be drawn from the volume 104, or to empty the reactor tank 102 of the mixed-phase fluid.

Other optional features can be included in the MCR 100. For example, as shown, a heater 170 can be introduced within the volume 104 or in conductive heat transfer contact with the reactor tank 102 (for example, by being wrapped around the reactor tank 102). In some aspects, the heater 170 can be controlled (for example, by control system 999) to heat the multi-phase fluid in the volume 104 so as to achieve a desired testing temperature. In addition, the MCR 100 can include transparent windows, made of resistant and durable materials such as borosilicate glass, for in-situ observation of the processes occurring in the reactor tank 102. Optionally, a camera can also be included (in the reactor tank 102 or with a view of the volume 104 through a window) to offer real-time visual information about the corrosion process and its progression within the reactor tank 102.

As shown in FIG. 1, the control system 999 can be communicably coupled (wired or wirelessly) to one or more components of the MCR 100 to provide or receive commands/data 990. In some aspects, control system 999 is a microprocessor-based system. Alternatively, control system 999 can be a mechanical system, electromechanical system, hydraulic system, pneumatic system, or combination thereof. In some aspects, for example, the control system 999 can be communicably coupled to the multi-channel potentiostat 116, the described valves (i.e., valve actuators), motor(s) (for example, of the agitator 114), the one or more sensors 126/128, and the heater 170 to control such components or receive data from such components. In operation, the control system 999 can show (for example, visually through a graphic user interface) the tendency of corrosion formation, corrosion rate, compatibility test of chemicals as well as simulated condition to decrease or accelerate corrosion.

Figure 2:
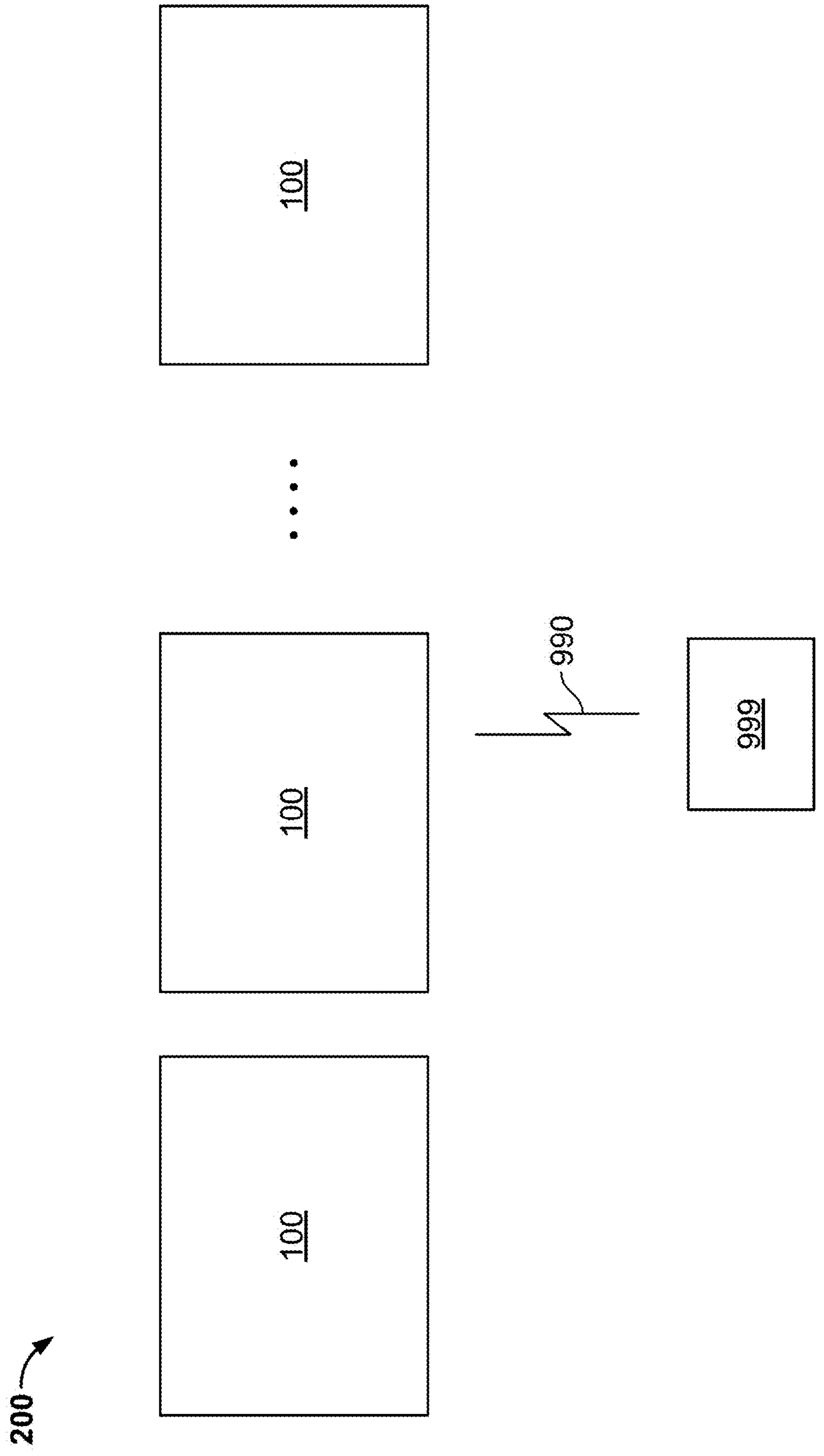
FIG. 2 is a schematic diagram of an example implementation of a microbiological corrosion reactor system that includes multiple microbiological corrosion reactors according to the present disclosure.

Example operations of MCR 100 can include, as described, the execution of real-time electrochemical tests, such as Open Circuit Potential (OCP), Linear Polarization Resistance (LPR), Electrochemical Impedance Spectroscopy (EIS), and Potentiodynamic Polarization (PDP). In some aspects, as shown in FIG. 2, an array 200 of MCRs 100 can be used and operated to perform such tests. For example, the MCR 100 can be used to evaluate the corrosion rate using potentiodynamic polarization (for example, which is a corrosion measuring technique that follows standards ASTM G 59 and ASTM F 2129). In this test, the potential, which is swept across a wide range, is applied to the WE 110, and the current is measured. This results in a polarization curve (potential vs. current) from which the corrosion rate can be extracted using, for example, a Tafel fitting by the control system 999.

In some aspects, each MCR 100 with its own three-electrode assembly 106, can be used simultaneously and individually controlled for large scale testing and diverse condition simulation. The multi-channel potentiostat 116 incorporated into each MCR 100 allows for concurrent testing to achieve resource efficiency and operational simplicity.

During testing, the RCE 110 can generate a known and constant shear to ensure a uniform stress distribution across its surface and an anaerobic environment within the reactor tank 102. The rotation rate of the RCE 110 can be adjusted to simulate hydrodynamic conditions adjacent to, for example, the target coupon 166, effectively tuning the wall shear stress to match hydrocarbon pipeline conditions. As a function of rotation rates, the wall shear stress (in Pa) on the surface of the RCE 110 can be expressed as:

$$\tau = 0.0791 \cdot N_{Re}^{-0.3} \cdot \rho \cdot U^2. \quad \text{Eq. 1}$$

In Eq. 1, ρ is the solution density (in kg/m$^3$), U is the linear velocity (in cm/s), and $N_{Re}$ is the Reynolds number, which characterizes the transition from laminar to turbulent flow, as shown by:

$$N_{Re} = \frac{U \cdot d}{v} = \frac{2r^2 \cdot (\pi/30) \cdot rpm}{v}. \quad \text{Eq. 2}$$

In Eq. 2, d is the diameter of the RCE 110 (in cm), r is the radius of RCE 110 (in cm), v is the kinematic viscosity of the mixed-phase fluid, and "rpm" is the rotations per minute of the RCE 110. U (in cm/s) is given by:

$$U = \omega r = \frac{\pi d}{60} \cdot rpm. \quad \text{Eq. 3}$$

In Eq. 3, ω is the rotational angular velocity (rad/s). Generally, for a WE 110 as an RCE, the flow is turbulent when $N_{Re}$ is greater than 2000, a condition achievable at relatively small rotation rates.

Figure 3:
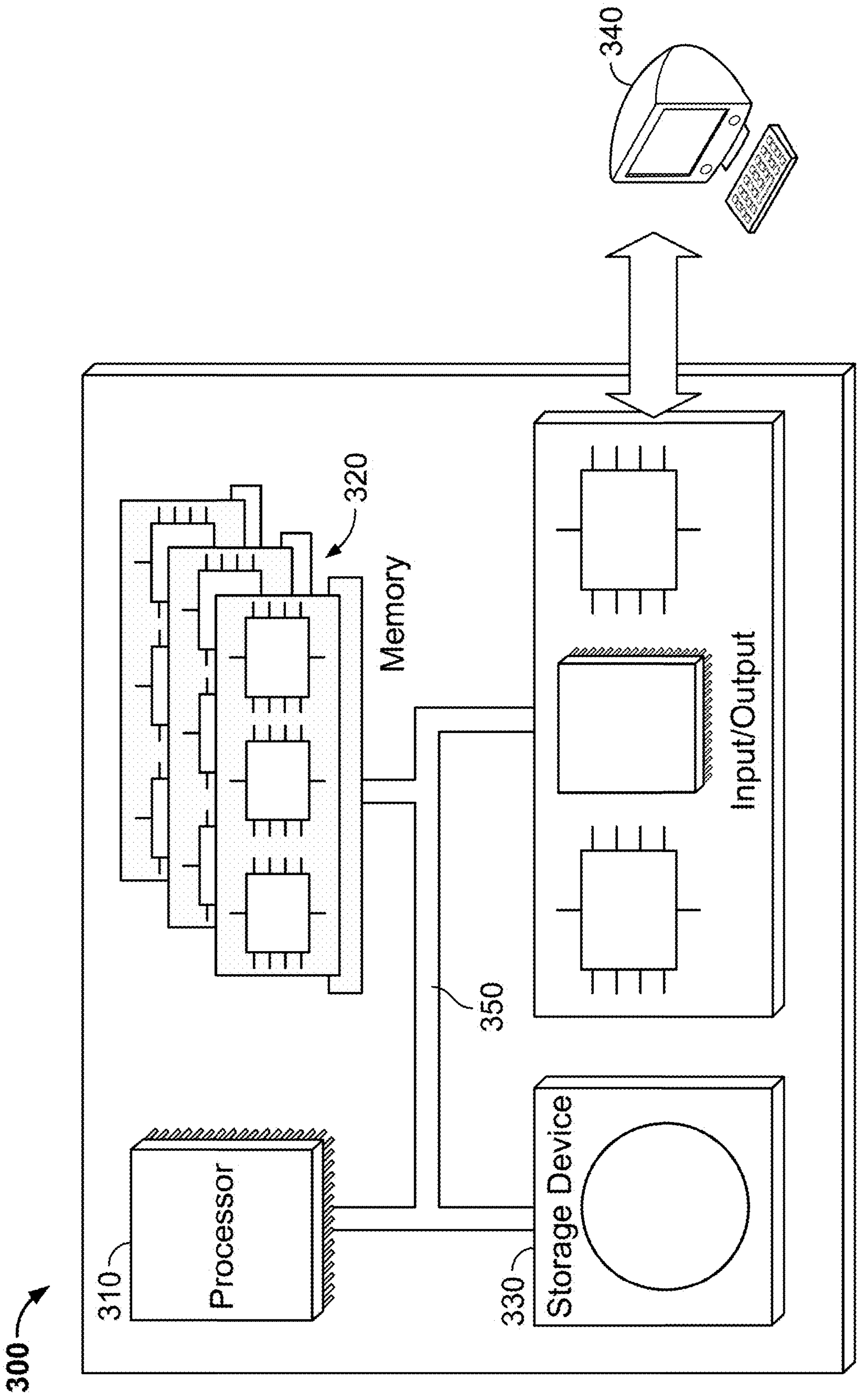
FIG. 3 is a schematic drawing of a control system that can be used to perform control operations for a microbiological corrosion reactor or a microbiological corrosion reactor system according to the present disclosure.

FIG. 3 is a schematic drawing of a control system 300 that can be used to perform control operations for a microbiological corrosion reactor or a microbiological corrosion reactor system according to the present disclosure according to the present disclosure. For example, all or parts of the control system (or controller) 300 can be used for the operations described previously, for example as or as part of the control system 999. The controller 300 is intended to include various forms of digital computers, such as printed circuit boards (PCB), processors, digital circuitry, or otherwise. Additionally, the system can include portable storage media, such as, Universal Serial Bus (USB) flash drives. For example, the USB flash drives can store operating systems and other applications. The USB flash drives can include input/output components, such as a wireless transmitter or USB connector that can be inserted into a USB port of another computing device.

The controller 300 includes a processor 310, a memory 320, a storage device 330, and an input/output device 340. Each of the components 310, 320, 330, and 340 are interconnected using a system bus 350. The processor 310 is capable of processing instructions for execution within the controller 300. The processor can be designed using any of a number of architectures. For example, the processor 310 can be a CISC (Complex Instruction Set Computers) processor, a RISC (Reduced Instruction Set Computer) processor, or a MISC (Minimal Instruction Set Computer) processor.

In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the control system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the controller 300. In one implementation, the storage device 330 is a computer-readable medium. In various different implementations, the storage device 330 can be a floppy disk device, a hard disk device, an optical disk device, a tape device, flash memory, a solid state device (SSD), or a combination thereof.

The input/output device 340 provides input/output operations for the controller 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a unit, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications can be made without departing from the spirit and scope of the disclosure. For example, example operations, methods, or processes described herein can include more steps or fewer steps than those described. Further, the steps in such example operations, methods, or processes can be performed in different successions than that described or illustrated in the figures. Accordingly, other implementations are within the scope of the following claims.

What is claimed is:

1. A microbiological corrosion reactor, comprising:

a reactor tank comprising a volume configured to enclose a mixed-phase wellbore fluid that comprises a gas phase, an oil phase, and a water phase;

a three-electrode cell assembly positioned in the volume, the three-electrode cell assembly comprising:

a working electrode, a counter electrode, and a reference electrode, each of the working electrode, the counter electrode, and the reference electrode positioned in the volume to contact the mixed-phase wellbore fluid concurrently across at least one of the gas phase, the oil phase, or the water phase;

a multi-channel potentiostat coupled to the three-electrode cell assembly;

at least one fluid tank fluidly coupled to the reactor tank through a conduit that comprises a valve, the at least one fluid tank configured to hold a volume of the mixed-phase wellbore fluid; and a control system coupled to the multi-channel potentiostat, the control system configured to perform operations comprising:

controlling the multi-channel potentiostat to operate the working electrode within the mixed-phase wellbore fluid in the volume; and determining, based on operation of the working electrode, a corrosion rate of at least one of the working electrode or a target coupon positioned within the mixed-phase wellbore fluid in the volume.

2. The microbiological corrosion reactor of claim 1, wherein the at least one fluid tank comprises a plurality of fluid tanks, each of the plurality of fluid tanks fluidly coupled to the reactor tank through a respective conduit that comprises a respective valve, a particular fluid tank configured to hold an inert gas, and another particular tank configured to hold an acid gas.

3. The microbiological corrosion reactor of claim 2, wherein the operations comprise:

operating the respective valve of the another particular fluid tank configured to hold the inert gas to flow a portion of the inert gas into the volume of the reactor tank; and operating the respective valve of the another particular fluid tank configured to hold the acid gas to flow a portion of the acid gas into the volume of the reactor tank.

4. The microbiological corrosion reactor of claim 3, wherein the inert gas comprises nitrogen, and the acid gas comprises at least one of carbon dioxide or hydrogen sulfide.

5. The microbiological corrosion reactor of claim 3, wherein the operations comprise determining, subsequent to at least one of flowing the portion of the inert gas or flowing the portion of the acid gas into the volume of the reactor tank, the corrosion rate of at least one of the working electrode or the target coupon.

6. The microbiological corrosion reactor of claim 1, comprising:

an inhibitor port and inhibitor valve fluidly coupled to the volume of the reactor tank; and a chemical injection port and chemical valve fluidly coupled to the volume of the reactor tank.

7. The microbiological corrosion reactor of claim 6, wherein the operations comprise at least one of:

operating the inhibitor valve to flow a corrosion inhibitor fluid through the inhibitor fluid port and into the volume of the reactor tank; or operating the chemical valve to flow a chemical fluid through the chemical injection port and into the volume of the reactor tank.

8. The microbiological corrosion reactor of claim 7, wherein the operations comprise determining, subsequent to at least one of flowing the corrosion inhibitor fluid or flowing the chemical fluid into the volume of the reactor tank, the corrosion rate of at least one of the working electrode or the target coupon.

9. The microbiological corrosion reactor of claim 1, comprising a plurality of sensors fluidly coupled to the mixed-phase wellbore fluid in the volume of the reactor tank, each of the plurality of sensors configured to measure a value of a characteristic of the mixed-phase wellbore fluid.

10. The microbiological corrosion reactor of claim 9, wherein the plurality of sensors comprise at least one temperature sensor, at least one gas sensor, and at least one pH sensor.

11. The microbiological corrosion reactor of claim 9, comprising:

a pressure relief valve positioned in a conduit in fluid communication with the volume of the reactor tank; and a vent valve in fluid communication with the volume of the reactor tank.

12. The microbiological corrosion reactor of claim 11, wherein the operations comprise operating at least one of the pressure relief valve or the vent valve to exhaust the gas phase of the mixed-phase wellbore fluid in the volume to the atmosphere based on a measured value of a particular characteristic of the mixed-phase wellbore fluid.

13. The microbiological corrosion reactor of claim 1, comprising a drain outlet positioned at or near a bottom of the reactor tank, the drain outlet comprising an outlet valve.

14. The microbiological corrosion reactor of claim 1, wherein the working electrode comprises a rotating cylinder electrode, and the operation of controlling the multi-channel potentiostat to operate the working electrode within the mixed-phase wellbore fluid in the volume comprises:

activating the rotating cylinder electrode to spin within the mixed-phase wellbore fluid.

15. The microbiological corrosion reactor of claim 1, wherein the operation of determining, based on operation of the working electrode, the corrosion rate of at least one of the working electrode or the target coupon positioned within the mixed-phase wellbore fluid in the volume comprises:

executing a potentiodynamic polarization test to sweep an electric potential applied to the working electrode across a range;

measuring, with the multi-channel potentiostat, a current across the working electrode during the potentiodynamic polarization test;

generating a polarization curve from the current measurements; and determining the corrosion rate from the polarization curve.

16. A method for determining microbiological corrosion, comprising:

flowing a mixed-phase wellbore fluid comprising a gas phase, an oil phase, and a water phase from at least one tank into a volume of a reactor tank of a microbiological corrosion reactor;

controlling a multi-channel potentiostat coupled to a three-electrode cell assembly positioned in the volume, the three-electrode cell assembly comprising a working electrode, a counter electrode, and a reference electrode, each of the working electrode, the counter electrode, and the reference electrode positioned in the volume to contact the mixed-phase wellbore fluid concurrently across at least one of the gas phase, the oil phase, or the water phase;

based on controlling the multi-channel potentiostat, activating the working electrode in the mixed-phase wellbore fluid in the volume; and determining, based on activating the working electrode, a corrosion rate of at least one of the working electrode or a target coupon positioned within the mixed-phase wellbore fluid in the volume.

17. The method of claim 16, wherein flowing the mixed-phase wellbore fluid from the at least one tank into the volume of the reactor tank of the microbiological corrosion reactor comprises:

flowing the oil phase from a first tank of the at least one tank into the volume; and separately from flowing the oil phase, flowing the water phase from a second tank of the at least one tank into the volume.

18. The method of claim 16, comprising at least one of:

flowing an inert gas from a third tank of the at least one tank into the volume of the reactor tank; or flowing an acid gas from a fourth tank of the at least one tank into the volume of the reactor tank.

19. The method of claim 18, wherein the inert gas comprises nitrogen, and the acid gas comprises at least one of carbon dioxide or hydrogen sulfide.

20. The method of claim 18, comprising determining, subsequent to flowing the at least one of the inert gas or the acid gas into the volume of the reactor tank, the corrosion rate of the at least one of the working electrode or the target coupon positioned within the mixed-phase wellbore fluid in the volume.

21. The method of claim 16, comprising at least one of:

flowing a corrosion inhibitor fluid into the volume of the reactor tank; or flowing a chemical fluid into the volume of the reactor tank.

22. The method of claim 21, wherein the corrosion inhibitor comprises at least one of a Tetrakis Hydroxymethyl Phosphonium Sulfate (THPS) or Glutaraldehyde based chemicals, and the chemical fluid comprises at least one of anodic inhibitors, cathodic inhibitors, fatty amines, organic acids-based corrosion, condensed phosphates, phosphate salts, poly (acrylic acid) (PAA), phosphinocarboxylic acid, sulfonated polymers, or phosphonates.

23. The method of claim 22, comprising determining, subsequent to flowing the at least one of the corrosion inhibitor or the chemical fluid into the volume of the reactor tank, the corrosion rate of the at least one of the working electrode or the target coupon positioned within the mixed-phase wellbore fluid in the volume.

24. The method of claim 16, comprising measuring, with at least one of a plurality of sensors fluidly coupled to the mixed-phase wellbore fluid in the volume of the reactor tank, a value of a characteristic of the mixed-phase wellbore fluid.

25. The method of claim 24, wherein the characteristic of the mixed-phase wellbore fluid comprises at least one of temperature, gas cut of the mixed-phase wellbore fluid, or pH.

26. The method of claim 24, comprising operating at least one of a pressure relief valve or a vent valve to exhaust the gas phase of the mixed-phase wellbore fluid in the volume to the atmosphere based on a measured value of a particular characteristic of the mixed-phase wellbore fluid.

27. The method of claim 16, comprising removing a sample of the mixed-phase wellbore fluid through a drain outlet positioned at or near a bottom of the reactor tank by operating an outlet valve.

28. The method of claim 16, wherein the working electrode comprises a rotating cylinder electrode, and activating the working electrode in the mixed-phase wellbore fluid in the volume comprises:

activating the rotating cylinder electrode to spin within the mixed-phase wellbore fluid.

29. The method of claim 16, wherein determining, based on activating the working electrode, the corrosion rate of at least one of the working electrode or the target coupon positioned within the mixed-phase wellbore fluid in the volume comprises:

executing a potentiodynamic polarization test to sweep an electric potential applied to the working electrode across a range;

measuring, with the multi-channel potentiostat, a current across the working electrode during the potentiodynamic polarization test;

generating a polarization curve from the current measurements; and determining the corrosion rate from the polarization curve.

* * * * *